(12) United States Patent
Ling et al.

(10) Patent No.: US 11,071,925 B2
(45) Date of Patent: Jul. 27, 2021

(54) MULTILAYER THIN FILM EVAPORATOR FOR STEAM HEATING

(71) Applicant: NANJING TECH UNIVERSITY, Nanjing (CN)

(72) Inventors: Xiang Ling, Nanjing (CN); Xin Huang, Nanjing (CN); Yang Li, Nanjing (CN); Minjie Gao, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 262 days.

(21) Appl. No.: 16/335,678

(22) PCT Filed: Mar. 6, 2017

(86) PCT No.: PCT/CN2017/075709
§ 371 (c)(1),
(2) Date: Mar. 22, 2019

(87) PCT Pub. No.: WO2018/054021
PCT Pub. Date: Mar. 29, 2018

(65) Prior Publication Data
US 2020/0030711 A1 Jan. 30, 2020

(30) Foreign Application Priority Data

Sep. 22, 2016 (CN) .......................... 201610843250.0

(51) Int. Cl.
*B01B 1/00* (2006.01)
*B01D 3/08* (2006.01)
(Continued)

(52) U.S. Cl.
CPC ................ *B01B 1/005* (2013.01); *B01D 3/00* (2013.01); *B01D 3/08* (2013.01); *F28D 7/106* (2013.01); *F28F 13/02* (2013.01)

(58) Field of Classification Search
CPC .. B01B 1/005; B01B 1/22; B01B 1/30; B01D 3/00; B01D 3/08; F28D 7/10; F28D 7/106; F28F 13/02
See application file for complete search history.

(56) References Cited

FOREIGN PATENT DOCUMENTS

| CN | 2080416 U | 7/1991 |
|---|---|---|
| CN | 1173380 A | 2/1998 |

(Continued)

OTHER PUBLICATIONS

Machine translation of CN 105727581 published Jul. 6, 2016.*

*Primary Examiner* — Brian A McCaig
(74) *Attorney, Agent, or Firm* — Bayramoglu Law Offices LLC (57) ABSTRACT

A multilayer thin film evaporator for steam heating includes a housing. A three-layer evaporation cylindrical core arranged in a nested manner with one layer placed inside the other is configured inside the housing. A limiting plate is configured to fix the three-layer evaporation cylindrical core. A feeding tube, a heating medium inlet tube, and a heating medium outlet tube are sequentially fixed under the limiting plate in a crosswise manner. A rotary rack spindle passing through a center of the three-layer evaporation cylindrical core, a rotary rack fixed on the rotary rack spindle and capable of rotating with the rotary rack spindle, and a motor component connected to a top end of the rotary rack spindle and capable of driving the rotary rack spindle to rotate are further provided.

8 Claims, 7 Drawing Sheets

(51) Int. Cl.
*F28D 7/10* (2006.01)
*B01D 3/00* (2006.01)
*F28F 13/02* (2006.01)

(56) References Cited

FOREIGN PATENT DOCUMENTS

| | | |
|---|---|---|
| CN | 203591601 U | 5/2014 |
| CN | 105688430 A | 6/2016 |
| CN | 105727581 A | 7/2016 |
| CN | 106362427 A | 2/2017 |
| GB | 2031140 A | 4/1980 |

\* cited by examiner

MULTILAYER THIN FILM EVAPORATOR FOR STEAM HEATING

CROSS REFERENCE TO THE RELATED APPLICATIONS

This application is the national phase entry of International Application No. PCT/CN2017/075709, filed on Mar. 6, 2017, which is based upon and claims priority to Chinese Patent Application No. 201610843250.0, filed on Sep. 22, 2016, the entire contents of which are incorporated herein by reference.

TECHNICAL FIELD

The present invention relates to the field of evaporators, and particularly to a multilayer thin film evaporator for steam heating.

BACKGROUND

The existing thin film evaporator is mainly composed of a jacket, a cylinder, a sealing head, a material distributor, a motor, a drive spindle, a rotary wiper, etc. When the thin film evaporator is working, the material is distributed to the heating wall of the inner wall of the evaporator cylinder from the top portion of the evaporator by the material distributor. Then, the rotary wiper is driven by the motor and the spindle to continuously and evenly wipe and form the liquid film having a uniform thickness on the inner wall of the cylinder, and the jacket is configured with the heating medium. The significant advantage of such a thin film evaporator is that a film turbulent state is formed on the evaporation surface of the inner wall of the material cylinder, which can greatly improve the heat transfer coefficient. However, the motor is mounted on the top of the thin film evaporator, and the rotary spindle is fixed by the bearing at the bottom of the evaporator, so the drive spindle is required to have a higher rigidity. Further, the height of the thin film evaporator and the diameter of the cylinder are also limited, thereby limiting the total heat transfer area of the thin film evaporator.

SUMMARY

The objective of the present invention is to provide a multilayer thin film evaporator for steam heating to enlarge the total heat transfer area of the thin film evaporator.

In order to achieve the above-mentioned objective, an implementation of the present invention provides a multilayer thin film evaporator for steam heating, which includes a housing, wherein a three-layer evaporation cylindrical core arranged in a nested manner with one layer placed inside the other is configured inside the housing; a limiting plate configured to fix the three-layer evaporation cylindrical core; a feeding tube, a heating medium inlet tube and a heating medium outlet tube, wherein the feeding tube, the heating medium inlet tube, and the heating medium outlet tube are sequentially fixed under the limiting plate in a crosswise manner; a rotary rack spindle passing through a center of the three-layer evaporation cylindrical core; a rotary rack fixed on the rotary rack spindle and capable of rotating with the rotary rack spindle; and a motor component connected to a top end of the rotary rack spindle and capable of driving the rotary rack spindle to rotate; wherein the housing of the multilayer thin film evaporator together with an upper sealing head and a lower sealing head forms a closed space, and all of the three layers of the three-layer evaporation cylindrical core are coaxial.

Further, each layer of the three-layer evaporation cylindrical core includes a mother liquid rising channel, a heating medium inlet channel, a heating medium outlet channel, an evaporation channel, and a heat insulation area, wherein the mother liquid rising channel, the heating medium inlet channel, the heating medium outlet channel, the evaporation channel, and the heat insulation area are arranged in parallel, the heat insulation area is located between the mother liquid rising channel and the heating medium inlet channel; one side of the evaporation channel is composed of evaporation wall surfaces; and the heating medium inlet channel and the heating medium outlet channel are separated by a separator.

Further, bottoms of the mother liquid rising channel, the heating medium inlet channel and the heating medium outlet channel are sealed by cover plates, and a bottom of the evaporation channel is an open structure.

Further, the limiting plate has a circular structure; a central circular hole is provided at a center of the limiting plate; a predetermined number of circular through holes are provided on the limiting plate along a diametrical direction; and a plurality of curved strip-shaped through holes are provided on the limiting plate along a circumferential direction.

Further, discharge tubes matched with the circular through holes on the limiting plate are provided on the feeding tube, the heating medium inlet tube, and the heating medium outlet tube respectively, wherein the discharge tube of the feeding tube passes through the corresponding circular through hole to be interconnected with the cover plate at the bottom of the mother liquid rising channel; the discharge tube of the heating medium inlet tube passes through the corresponding circular through hole to be interconnected with the cover plate at the bottom of the heating medium inlet channel; and the discharge tube on the heating medium outlet tube passes through the corresponding circular through hole to be interconnected with the cover plate at the bottom of the heating medium outlet channel.

Further, a bottom of the rotary rack spindle passes through the central circular hole on the limiting plate and is fixed by a bearing.

Further, three cantilevers are provided on the rotary rack; the three cantilevers form a 120-degree angle between one another; suspension rods with a same number as a layer number of the evaporation channel are connected to the cantilevers; each suspension rod is provided a circular ring; a wiper is mounted on the circular ring; and the suspension rods, the circular ring, and the wiper extend into each layer of evaporation channel.

Further, overflow grooves are provided at top portions of the heating medium inlet channel and the heating medium outlet channel; a mother liquid in the mother liquid rising channel overflows to the evaporation wall surfaces through the overflow grooves; a height difference between left baffles and right baffles of the overflow grooves is not less than 10 mm.

According to the above-mentioned implementations of the present invention, a three-layer evaporation cylindrical core is provided inside a thin film evaporator in the present invention. The feeding tube, the heating medium inlet tube, the heating medium outlet tube and the three-layer evaporation cylindrical core work collaboratively, so as to enlarge the total heat transfer area of the thin film evaporator, and thus improving the production efficiency.

DETAILED DESCRIPTION OF THE EMBODIMENTS

In order to make the person skilled in the art better understand the technical solutions in the present application, the technical solutions in the embodiments of the present invention will be clearly and completely described hereinafter with reference to the drawings in the embodiments of the present invention. Obviously, the described embodiments are merely a part of the embodiments of the present invention rather than all. Any other embodiments obtained by an ordinary person skilled in the art based on the embodiments of the present invention without creative efforts should be considered as falling within the scope of the present invention.

As shown in FIG. 1 to FIG. 6, the multilayer thin film evaporator of the present invention includes a housing; wherein a three-layer evaporation cylindrical core 1 arranged in a nested manner with one layer placed inside the other is configured inside the housing; a limiting plate 2 configured to fix the three-layer evaporation cylindrical core 1; a feeding tube 6, a heating medium inlet tube 7, and a heating medium outlet tube 8, wherein the feeding tube 6, the heating medium inlet tube 7, and the heating medium outlet tube 8 are sequentially fixed under the limiting plate 2 in a crosswise manner; a rotary rack spindle 3 passing through a center of the three-layer evaporation cylindrical core 1; a rotary rack 4 fixed on the rotary rack spindle 3 and capable of rotating with the rotary rack spindle 3; and a motor component 9 connected to a top end of the rotary rack spindle 3 and capable of driving the rotary rack spindle 3 to rotate; wherein the housing of the multilayer thin film evaporator together with an upper sealing head 10 and a lower sealing head 11 forms a closed space, and all of the three layers of the three-layer evaporation cylindrical core 1 are coaxial.

Figure 1:
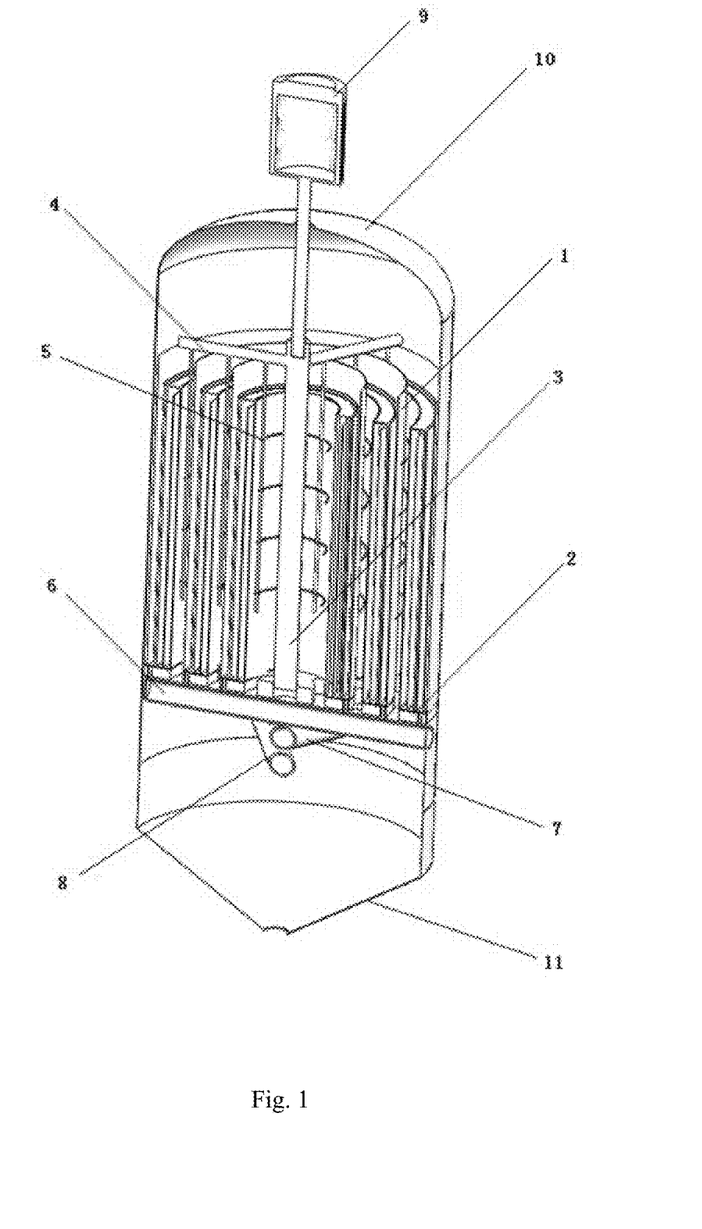
FIG. 1 is a cross-sectional view of a multilayer thin film evaporator in the present invention.
Figure 2:
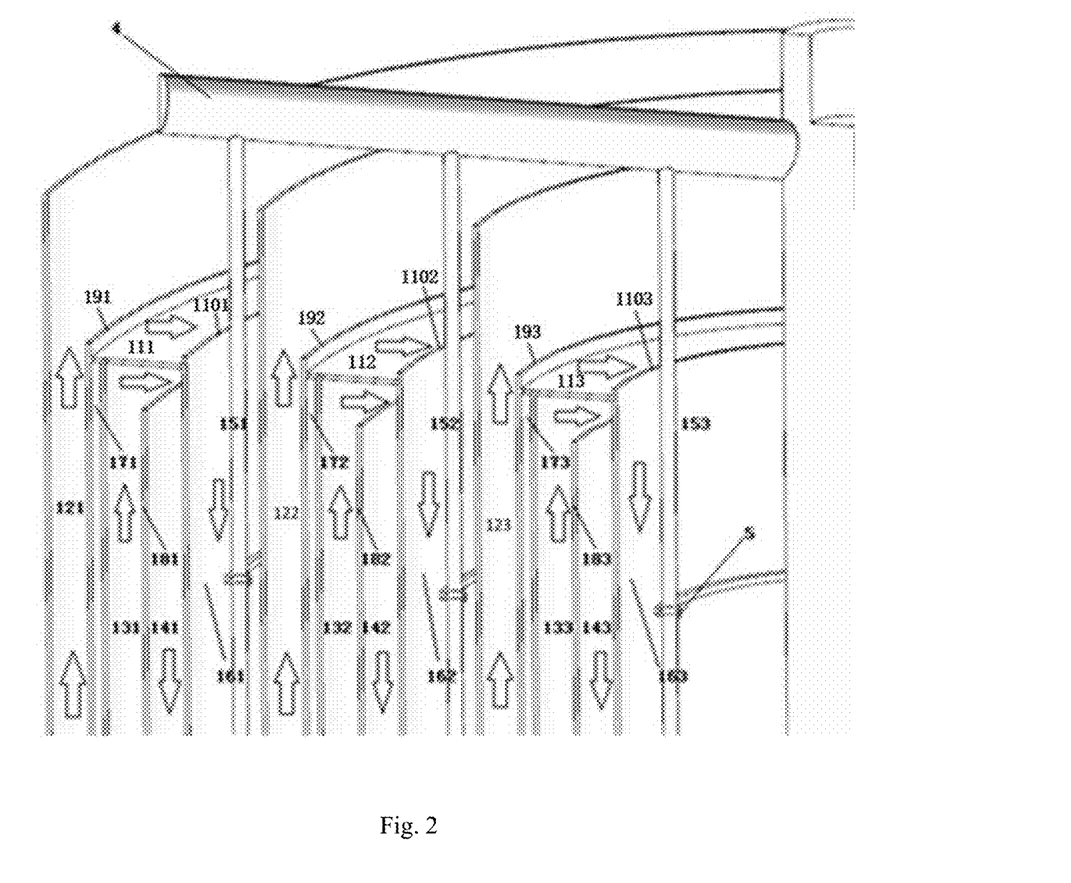
FIG. 2 is a cross-sectional view showing a partial heat transfer structure of the channels of the three-layer evaporation cylindrical core in the present invention.

In an embodiment of the present invention, each layer of the three-layer evaporation cylindrical core includes mother liquid rising channels 121-123, heating medium inlet channels 131-133, heating medium outlet channels 141-143, evaporation channels 151-153, and heat insulation areas 171-173. The mother liquid rising channels 121-123, heating medium inlet channels 131-133, heating medium outlet channels 141-143, evaporation channels 151-153, and heat insulation areas 171-173 are arranged in parallel. The heat insulation areas are located between the mother liquid rising channels and the heating medium inlet channels. One side of the evaporation channel is composed of evaporation wall surfaces 161-163. The heating medium inlet channels and the heating medium outlet channels are separated by separators 181-183.

In an embodiment of the present invention, bottoms of the mother liquid rising channels 121-123, the heating medium inlet channels 131-133, and the heating medium outlet channels 141-143 are sealed by cover plates (not shown in the drawings), and bottoms of the evaporation channels 151-153 are open structures.

Figure 3A:
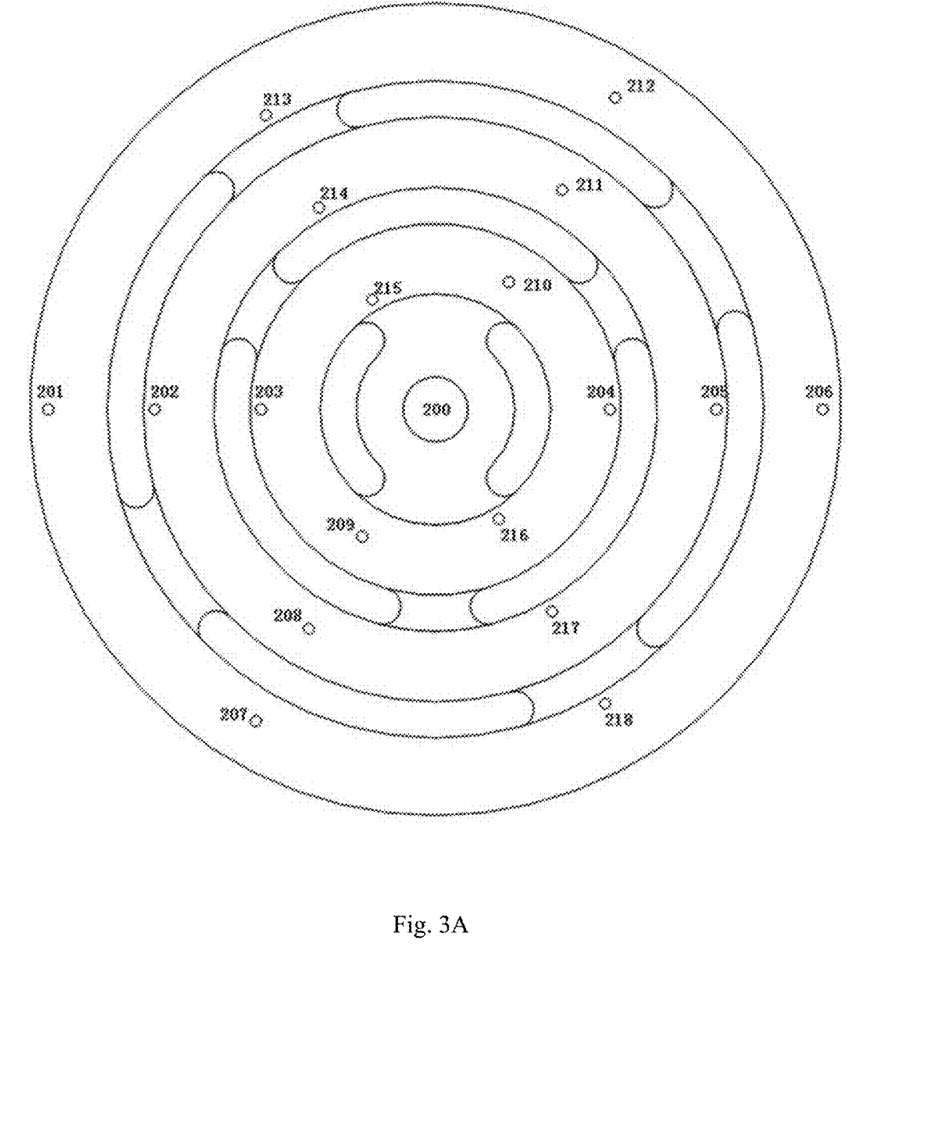
FIG. 3A is a structural schematic diagram of a limiting plate in the present invention.
Figure 3B:
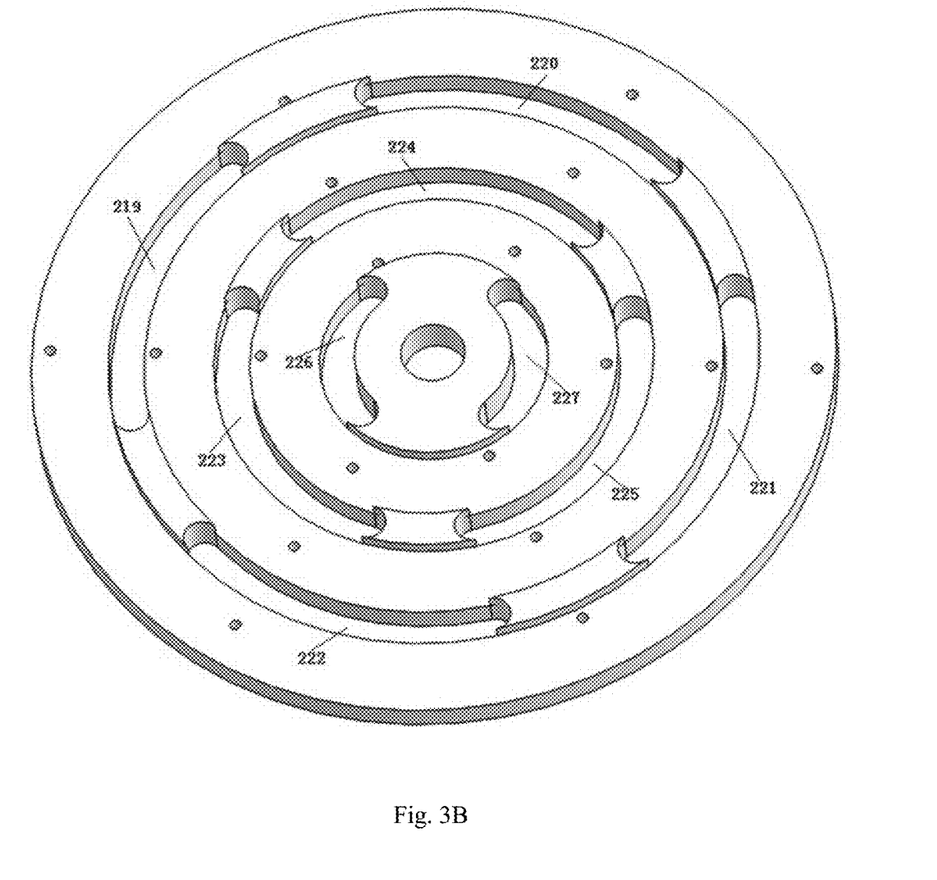
FIG. 3B is another structural schematic diagram of the limiting plate in the present invention.

In an embodiment of the present invention, the limiting plate 2 is a circular structure. A central circular hole 200 is provided at a center of the limiting plate. A predetermined number of circular through holes 201-218 are provided on the limiting plate 2 along a diametrical direction. A plurality of curved strip-shaped through holes 219-227 are provided on the limiting plate 2 along a circumferential direction.

Figure 4:
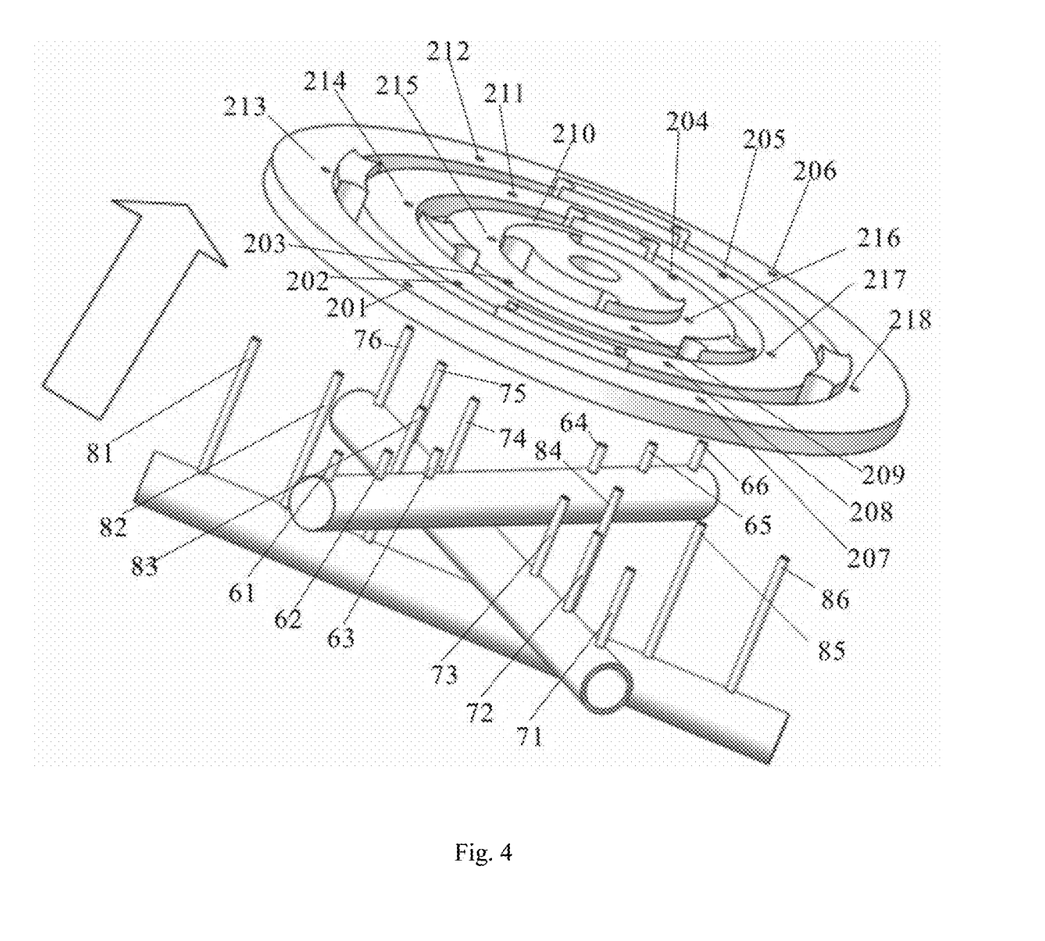
FIG. 4 is an assembling diagram of the limiting plate and the feeding tube, the heating medium inlet and outlet tube in the present invention.

In an embodiment of the present invention, discharge tubes matched with the circular through holes 201-218 on the limiting plate are provided on the feeding tube 6, the heating medium inlet tube 7 and the heating medium outlet tube 8, respectively. The discharge tubes 61-66 of the feeding tube 6 pass through the corresponding circular through holes 201-206 to be interconnected with the cover plates at the bottoms of the mother liquid rising channels 121-123. The discharge tubes 71-76 of the heating medium inlet tube 7 pass through the corresponding circular through holes 207-212 to be interconnected with the cover plates at the bottoms of the heating medium inlet channels 131-133. The discharge tubes 81-86 of the heating medium outlet tube 8 pass through the corresponding circular through holes 213-218 to be interconnected with the cover plates at the bottoms of the heating medium outlet channels 141-143.

In an embodiment of the present invention, a bottom of the rotary rack spindle 3 passes through the central circular hole 200 on the limiting plate 2 and is fixed by a bearing (not shown in the drawings).

Figure 5:
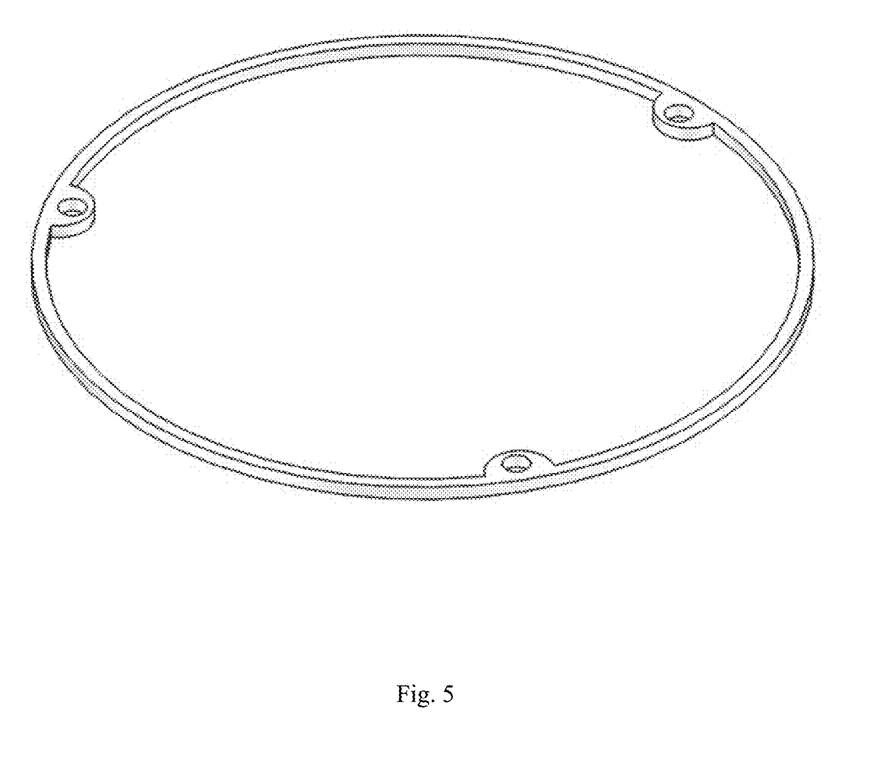
FIG. 5 is a structural diagram of a circular ring and a scraper in the present invention.
Figure 6:
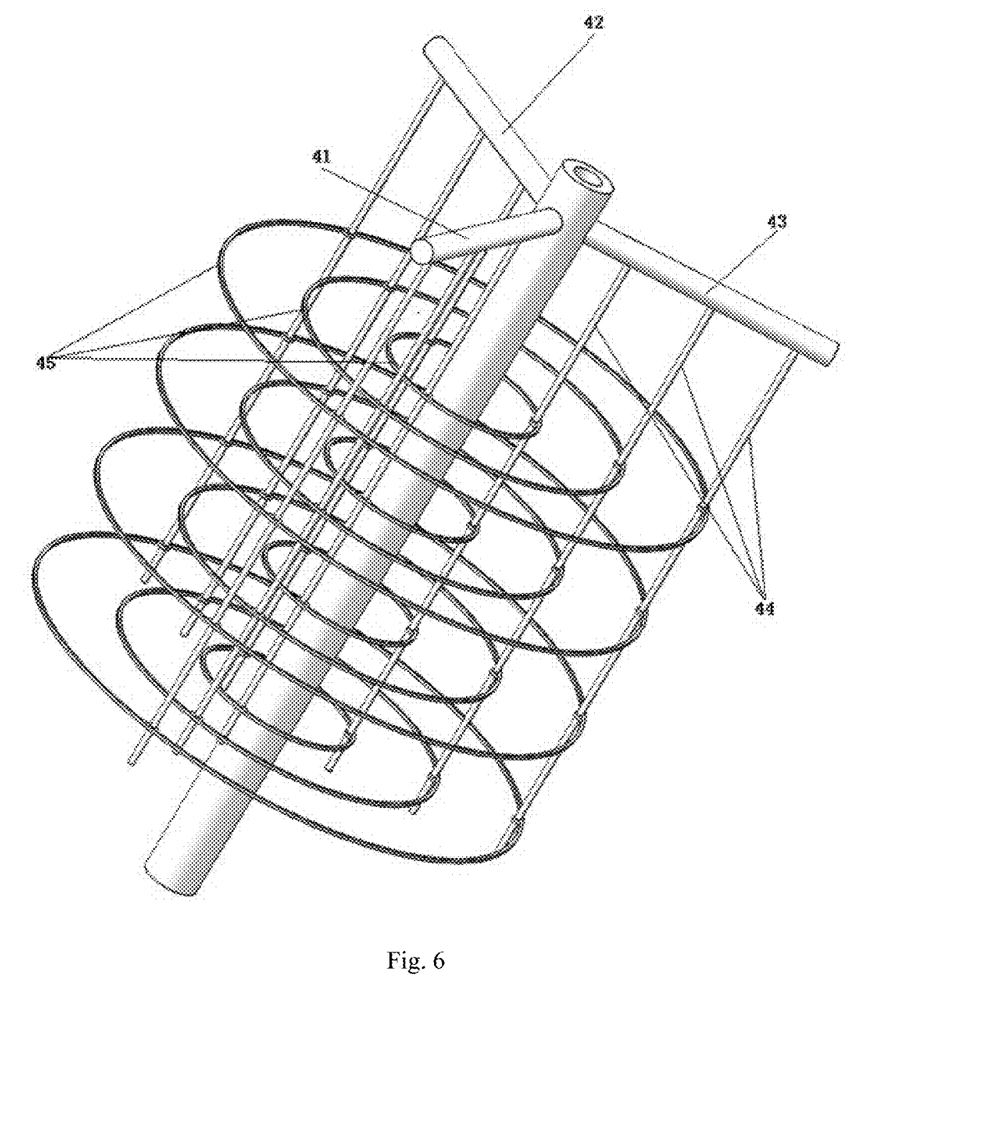
FIG. 6 is an assembly diagram of the rotary rack, the circular ring, and the wiper in the present invention.

In an embodiment of the present invention, three cantilevers 41-43 are provided on the rotary rack 4. The three cantilevers 41-43 form a 120-degree angle between one another. Suspension rods 44 with a same number as a layer number of the evaporation channels are connected to the cantilevers. The suspension rods 44 are provided circular rings 45. Wipers 5 are mounted on the circular rings 45. The suspension rods 44, the circular rings 45 and the wipers 5 extend into each layer of the evaporation channels.

In an embodiment of the present invention, overflow grooves 111-113 are provided at top portions of the heating medium inlet channels 131-133 and the heating medium outlet channels 141-143. A mother liquid in the mother liquid rising channels 121-123 overflows to the evaporation wall surfaces 161-163 through the overflow grooves 111-113. The height difference between left baffles 191-193 and right baffles 1101-1103 of the overflow grooves is not less than 10 mm.

Taking the outermost cylindrical core as an example, when the thin film evaporator is working, steam first enters into the mother liquid rising channel 121, so as to prevent the over-quick evaporation which will cause coking on the evaporation surface when the mother liquid first enters into the mother liquid rising channel 121. After the heating medium inlet tube 7 is opened, the steam enters the circular through holes 207 and 212 on the limiting plate 2 through the discharge tubes 71 and 76, and then is injected into the heating medium inlet channel 131 to rise along the channel. Since there is a heat insulation area 171 between the mother liquid rising channel 121 and the heating medium inlet channel 131, the heat of the steam will not be transferred in the rising process. After that, the steam enters the heating medium outlet channel 141, and flows back to the discharge tubes 81 and 86 of the heating medium outlet tube 8 along the through holes 213 and 218 of the limiting plate 2. After the feeding tube 6 is opened, the mother liquid enters the through holes 201 and 206 on the limiting plate 2 through the discharge tubes 61, 66, and then enters the mother liquid rising channel 121 to slowly fill therein. After passing through the mother liquid rising channel, the mother liquid passes over the left baffle 191 to enter the overflow groove 111. Then, the mother liquid passes over the right baffle 1101, so that the liquid material is uniformly and continuously distributed on the evaporation wall surface 161. Under the effect of gravity and the annular wiper 5 fixed on the rotary rack, a film turbulent state is formed by the liquid distributed on the evaporation wall surface, and the liquid material is continuously evaporated and concentrated in the descending process of the evaporation channel 151. The finished liquid is discharged from the tapered sealing head on the bottom through the curved strip-shaped through holes 219-222 of the limiting plate. The secondary steam escapes from the top.

According to the above-mentioned implementations of the present invention, a three-layer evaporation cylindrical core is provided in a thin film evaporator of the present invention. The feeding tube, the heating medium inlet tube, the heating medium outlet tube, and the three-layer evaporation cylindrical core work collaboratively, so as to enlarge the total heat transfer area of the thin film evaporator, and thus improving the production efficiency.

The above descriptions of various implementations of the present invention are provided on the person skilled in the art without listing exhaustive examples or are not intended to limit the present invention to the single disclosed embodiment. As described above, various alternatives and modifications of the present invention will be obvious to those skilled in the art. Thus, notwithstanding a part of alternative embodiments have been discussed in detail, other embodiments will be obvious or obtained easily by the person skilled in the art. Any alternatives, modifications, variations of the present invention and other embodiments within the spirit and scope of the present invention are contained in the present invention.

The various embodiments in the specification are described in a successive manner, and the same or similar parts among the various embodiments can be referred to each other. The differences between the various embodiments are emphasized in the embodiments.

Although the present invention is described by the embodiments, it will be known by the ordinary person skilled in the art that many transformations and modifications without departing from the spirit of the present invention are contained in the present invention, and the appended claims cover all these transformations and modifications within the spirit of the present invention.

What is claimed is:

1. A multilayer thin film evaporator for steam heating, comprising: a housing;
   wherein, a three-layer evaporation cylindrical core arranged in a nested manner is configured inside the housing;
   a limiting plate configured to fix the three-layer evaporation cylindrical core;
   a feeding tube, a heating medium inlet tube, and a heating medium outlet tube;
   wherein, the feeding tube, the heating medium inlet tube, and the heating medium outlet tube are sequentially fixed under the limiting plate in a crosswise manner;
   a rotary rack spindle passing through a center of the three-layer evaporation cylindrical core;
   a rotary rack fixed on the rotary rack spindle, wherein the rotary rack is configured to rotate with the rotary rack spindle; and
   a motor component connected to a top end of the rotary rack spindle, wherein the rotary rack is configured to drive the rotary rack spindle to rotate;
   wherein the housing of the multilayer thin film evaporator together with an upper sealing head and a lower sealing head forms a closed space, and three layers of the three-layer evaporation cylindrical core are coaxial.

2. The multilayer thin film evaporator according to claim 1, wherein each layer of the three-layer evaporation cylindrical core comprises a mother liquid rising channel, a heating medium inlet channel, a heating medium outlet channel, an evaporation channel, and a heat insulation area;
   wherein the mother liquid rising channel, the heating medium inlet channel, the heating medium outlet channel, the evaporation channel, and the heat insulation area are arranged in parallel;
   the heat insulation area is located between the mother liquid rising channel and the heating medium inlet channel;
   one side of the evaporation channel is composed of evaporation wall surfaces; and
   the heating medium inlet channel and the heating medium outlet channel are separated by a separator.

3. The multilayer thin film evaporator according to claim 2, wherein bottoms of the mother liquid rising channel, the heating medium inlet channel, and
   the heating medium outlet channel are sealed by cover plates, and a bottom of the evaporation channel is an open structure.

4. The multilayer thin film evaporator according to claim 3, wherein the limiting plate is a circular structure;
   a central circular hole is provided at a center of the limiting plate;
   a plurality of circular through holes are provided on the limiting plate along a diametrical direction; and
   a plurality of curved strip-shaped through holes are provided on the limiting plate along a circumferential direction.

5. The multilayer thin film evaporator according to claim 4, wherein a discharge tube matched with the circular through hole on the limiting plate is provided on each of the feeding tube, the heating medium inlet tube, and the heating medium outlet tube, respectively;
   wherein the discharge tube of the feeding tube passes through a corresponding circular through hole to be interconnected with the cover plate at the bottom of the mother liquid rising channel, the discharge tube of the heating medium inlet tube passes through a corresponding circular through hole to be interconnected with the cover plate at the bottom of the heating medium inlet channel, and the discharge tube of the heating medium outlet tube passes through a corresponding circular through hole to be interconnected with the cover plate at the bottom of the heating medium outlet channel.

6. The multilayer thin film evaporator according to claim 4, wherein a bottom of the rotary rack spindle passes through the central circular hole on the limiting plate and is fixed by a bearing.

7. The multilayer thin film evaporator according to claim 2, wherein three cantilevers are provided on the rotary rack;
   wherein the three cantilevers form a 120-degree angle between one another;

suspension rods with a same number as a layer number of the evaporation channel are connected to the cantilevers;

each suspension rod is provided with a circular ring;

a wiper is mounted on the circular ring; and the suspension rods, the circular ring and the wiper extend into each layer of the evaporation channel.

8. The multilayer thin film evaporator according to claim 2, wherein overflow grooves are provided at top portions of the heating medium inlet channel and the heating medium outlet channel;

wherein a mother liquid in the mother liquid rising channel overflows to the evaporation wall surfaces through the overflow grooves; and a height difference between left baffles and right baffles of the overflow grooves is not less than 10 mm.

* * * * *